Jan. 27, 1948.  G. A. F. MACHLET  2,434,941
ELECTRONIC MEASURING AND CONTROL APPARATUS
Filed Aug. 21, 1943  2 Sheets-Sheet 1
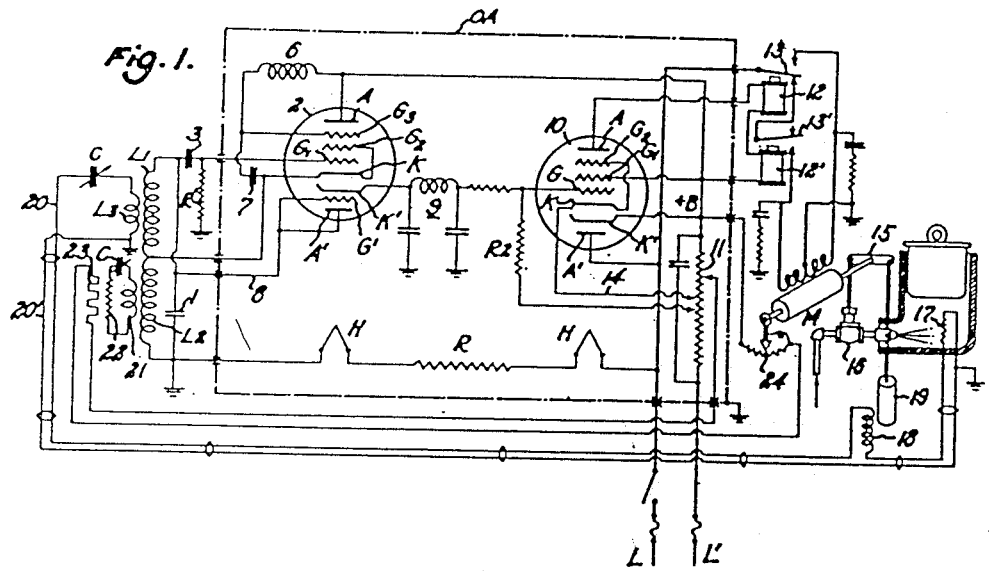
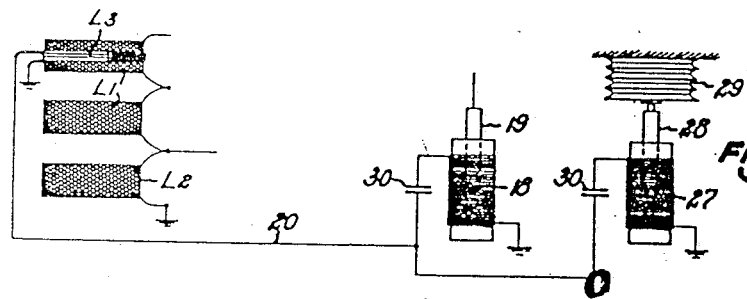
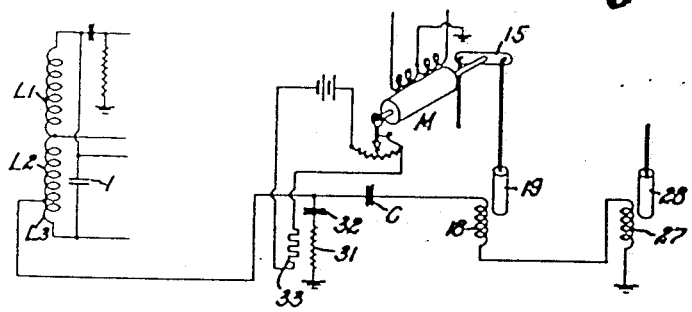
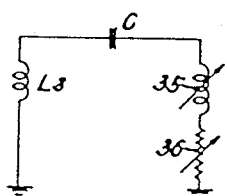

Inventor:
George A. F. Machlet
by Pierce + Scheffler
Attorneys.

Patented Jan. 27, 1948

2,434,941

UNITED STATES PATENT OFFICE 2,434,941

ELECTRONIC MEASURING AND CONTROL APPARATUS

George A. F. Machlet, Elizabeth, N. J.

Application August 21, 1943, Serial No. 499,557

29 Claims. (Cl. 236—68)

This invention relates to electronic measuring and control apparatus, and more particularly to electronic apparatus of high sensitivity that responds to variations in a control factor, such as temperature, direction, pressure, current flow or the like, to register or record the changes in magnitude and/or to energize a control system in accordance with the change in the control factor.

The electronic type of indicating and control apparatus may be designed for exceedingly high sensitivity since the initial change that a variable control factor imposes upon a current or voltage may be amplified to develop the power required for operation of an indicating or control element. There are practical limits, however, upon the sensitivity of such electronic systems in view of instability arising from stray fields in the vicinity of the apparatus and/or to the disturbing effects upon adjacent radio equipment of high intensity field within the electronic system if it is not carefully shielded.

The present invention relates to electronic measuring or control apparatus in which high sensitivity is accompanied by a high stability against disturbance from variations in conditions other than the preselected measuring or control factor. The apparatus includes a primary or input circuit of low impedance that couples the factor-responsive element, for example a resistance or a reactance in the case of a temperature-responsive measuring or control system, to a circuit of the electronic elements. The low impedance circuit is not appreciably affected by stray fields or changes in capacitive couplings, nor does it produce fields of high intensity that may interfere with the operation of other equipment.

Objects of the invention are to provide sensitive electronic measuring and control systems that are substantially unaffected by the variations in electrical values other than the particular electrical value or values that change in magnitude with the preselected control factor or factors. An object is to provide electronic measuring and control apparatus in which an electrical value, such as voltage, current or phase, is varied by changes in the magnitude of a selected control factor, and the change in the factor-varied electrical value is imposed upon or introduced into an electronic circuit of high power amplification through a coupling circuit of low impedance, whereby variations in field conditions about the coupling circuit will have a negligible effect upon the power output of the electronic circuit. More specifically, objects are to provide electronic measuring and control apparatus including vacuum tube oscillator or amplifier circuits that regulate a power-operated device in accordance with changes in current amplification or phase that are introduced into the vacuum tube circuits through a low impedance circuit having resistive and/or reactive elements that are affected by a preselected control factor.

These and other objects and advantages of the invention will be apparent from the following specification when taken with the accompanying drawings in which:

Fig. 1 is a circuit diagram of an embodiment of the invention as applied to the regulation of the fuel supply to a heating furnace;

Fig. 2 is a fragmentary circuit diagram of another form of low impedance primary circuit that may be used in electronic control apparatus of Fig. 1, the circuit elements being shown schematically to indicate appropriate physical constructions;

Fig. 3 is a circuit diagram of an oscillator type of control apparatus in which the primary circuit includes, in addition to the variable inductances such as those of the Fig. 2 circuit, an adjustable impedance for resetting the control apparatus for operation about a desired value of control factor;

Figs. 4a and 4b are simplified diagrams of other forms of low impedance primary circuits;

Figure 8:
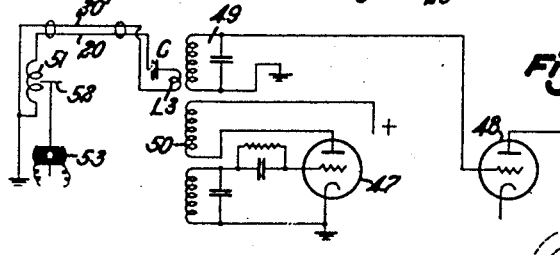
Figure 9:
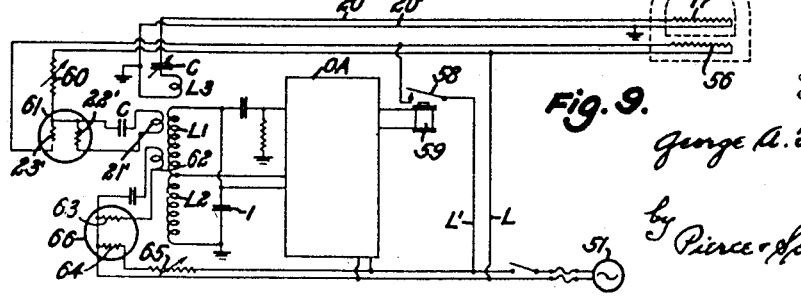

Fig. 8 is a fragmentary circuit diagram of an electronic measuring or control apparatus in which the link circuit coupling an oscillator to an amplifier unit is tuned by a primary low impedance circuit including an adjustable impedance that varies in value with the selected control factor; and Fig. 9 is a circuit diagram of another embodiment of the invention as applied to the control of an electrically heated furnace or oven.

In Fig. 1 of the drawings, the reference characters L1, L2 identify coupled inductances that are shunted by a condenser 1 to form an oscillatory circuit for determining the frequency of the oscillatory output of an electronic tube 2. The high potential terminal of the oscillatory circuit is connected through a coupling condenser 3 to the control grid G1 of an oscillator tube 2 in conventional manner. The oscillator tube elements, as illustrated, include a screen grid G3 connected to the anode A through a radio frequency choke 6 and to the cathode K through condenser 7, and a suppressor grid G2 that is connected to the cathode K within the tube. The junction of the inductances L1, L2 is connected to the cathode K, the outer terminal of L2 is grounded, and the control grid is returned to ground through the usual bias resistor R'.

The oscillatory current developed in the oscillatory circuit is impressed upon a rectifier by a lead 8 that extends to the joined grid electrode G' and plate A' that cooperate with a second cathode K' within the tube 2. Separate oscillator and rectifier tubes may of course be substituted for the dual purpose tube 2 shown in Fig. 1. The rectifier cathode K' is connected through a filter network 9 to the control grid G of the amplifier elements of a second dual purpose tube 10. The screen grid G1 is connected directly to the positive terminal +B of a direct current source that may be a voltage divider resistor 11. The suppressor grid G2 is connected to the cathode K of the amplifier, and the anode A is connected to the +B terminal through a sensitive instrument type relay or, as shown, through the serially connected relays 12, 12' controlling single pole, double throw switches 13, 13' that have movable blades spring biased to float between closely spaced contacts at a predetermined normal current output from the amplifier tube 10. The back contact of relay 12 is connected to one field winding of the reversible motor M, and the front contact is connected to the other field winding, the front contact of relay 12 being connected to the movable blade of switch 13' of relay 12'. The blade of switch 13 is connected to one side L of a power line L, L', the other side L' and the junction of the motor windings being grounded. The relays are of similar design but the pickup value of the relay 12 is somewhat less than the pickup value of the relay 12', and the movable blades of switches 13, 13' are displaced to engage their front contacts as the amplifier output rises to and then rises above, respectively, a narrow range of current values corresponding to a balanced condition of the oscillator network. It will be apparent that the illustrated circuit connections will open both windings of the reversible motor M when relay 12 is pulled in and relay 12' is not, and will prevent the simultaneous energization of both windings under all combinations of settings of the switches 13, 13'. The voltage divider 11 is energized through the rectifier section of tube 10, which rectifier comprises a cathode K' connected to the +B terminal and an anode A' that is connected to side L of the line L, L' that may be a conventional 110 volts light and power circuit fed from a direct current or an alternating current source. The other side L' of the line is connected to the negative terminal of the voltage divider 11 and to ground. The heaters H of the tubes are connected across the power supply leads L, L' in series with a voltage drop resistor R.

A negative bias is impressed upon the grid G of tube 10 by connecting the grid through a high resistance R2 to a more negative point on the voltage divider 11 than that to which the cathode K is connected by a lead 14. The negative bias is of such magnitude that the amplifier is biased to cutoff for values of rectified input to control grid G below a certain preselected value. The plate current of the tube 10 is therefore proportional to the intensity of oscillations of the tube 5, and the relays are so adjusted or designed that the blades of the relay switches 13, 13' hover between their opposed stationary contacts at definite and slightly different narrow ranges of plate current values.

The reversible motor M actuates a recording stylus or, as shown, a rocker-arm 15 or other means for adjusting the modulating valve 16 in the fuel supply system to a furnace or heater. The current through the relays 12, 12' must be varied in such manner, in response to variations in the heat supply and/or the heat demand, that the blades of switches 13, 13' are spaced from their respective contacts that lead to the motor windings only when the supply and demand factors are in equilibrium and the furnace temperature is at, or approximately at, the desired value. This system of control requires an unbalance of the oscillatory circuit L1, L2 upon a departure of the furnace temperature from the desired value, and a rebalance of the oscillatory circuit upon the adjustment of the fuel supply valve 16 to re-establish an equilibrium of the heat supply and heat demand factors.

Prior electronic measuring and control systems have usually located the temperature-response "unbalancing" element directly in the oscillatory circuit L1, L2, 2 and, in general, this circuit element has been a small condenser having one electrode mounted on the instrument pointer of an electrical system for measuring temperature, or it has been a small coil and a cooperating vane carried by the instrument. In accordance with this invention, the "unbalancing" element is located in a low impedance circuit that has a step-up inductive coupling to the oscillator circuit. For convenience of description, the low impedance circuit will be termed the "primary circuit" since it includes the factor-controlled impedance that initiates a measuring or control operation of the apparatus. The primary circuit may include a rebalancing and/or a resetting element in some forms of the invention.

The primary circuit of Fig. 1 includes an "unbalancing" element in the form of a temperature-variant resistance 17 within the furnace space, and a "rebalancing" impedance comprising a coil 18 having a core 19, of magnetic or non-magnetic material, that is adjusted by the rockarm 15. A lead 20 connects these balance-affecting elements in series with each other and with the condenser C and a coil L3 that is coupled to the grid coil L1 of the oscillator. The primary circuit is closed by grounding a terminal of resistance 17 and of coils L3 but it is preferable, in general, to parallel the lead 20 by another lead 20' that, as indicated diagrammatically by the loops, is taped to or otherwise connected to lead 20 to form a cable of two conductors in closely adjacent fixed relation. The primary circuit is tuned to, or approximately to, the oscillator frequency and the normal balance of the control system is disturbed when the effective resistance of the resistor 17 rises above or falls below the value corresponding to the desired furnace temperature. The coupling coil L3 may comprise a few turns, for example from 3 to 5 turns, of wire wound directly upon the multiple layer, space wound coil L1, see Fig. 2, and the condenser C is adjustable, as a factory adjustment, for tuning of the primary circuit. When a fixed condenser is used, or when only the distributed capacity of the circuit is relied upon for tuning, the circuit is adjusted to resonance by a selection of the number of turns of the coupling coil L3.

The turn ratio of coils L1, L3 provides a step-down from the oscillator circuit to the primary circuit, and relatively small changes in an impedance of the primary circuit therefore reflect a magnified phase or impedance change into the oscillator circuit. The step-down coupling into the primary circuit permits use of a low impedance primary circuit that is relatively insensitive to casual influences, particularly to stray capacitive couplings, that have caused considerable difficulty in prior sensitive control systems of the electronic type. In most instances, it is not necessary to shield the cable 20, 20' to prevent disturbance to other equipment by the fields set up by high frequency current in the control system, nor to make calibrating adjustments of the apparatus to eliminate the effects of extraneous fields for different arrangements of the cable with respect to fixed or moving bodies.

The temperature-control apparatus of Fig. 1 also includes means for resetting the system for operation about the desired temperature point after a rebalance is effected by an adjustment of core 19 after an unbalance arising from a change in the effective value of resistor 17. The resetting circuit comprises a coil 21 that consists of a few turns of wire wound on inductance L2 of the oscillator circuit, a temperature-variant resistance 22 in circuit with coil 21 and condenser C, a heater resistance 23 in heat-transfer relation to resistance 22, and a variable resistance 24 adjustable by the motor M to regulate the current supplied to the heater 23 from the voltage divider 11 in accordance with the setting of the fuel supply valve 16. Changes in the effective value of resistance 21 result in changes in energy absorbed from oscillator coil L2 due to the step-up coupling of coil 21 to coil L2, and the resultant unbalance of the oscillator system is in the same sense and of substantially the same magnitude as the initial unbalance due to the change in the value of resistance 17.

Assuming that the temperature within the furnace chamber is at its desired normal value, the resistance 17 has such a value that the rectified current output of the oscillator-rectifier tube 2 is at the preselected value for which the current output of amplifier tube 10 holds the relay switch blade 13 on its front contact and the relay switch blade 13' on its back contact. A change in the heat input or in the heat demand will result in a change in the value of resistance 17, and this resistance change will reflect a resistance change into the oscillator circuit through the step-up transformer L3, L1. The rectified oscillator output is thereby altered and, in turn, the plate current of tube 10 is altered and the relay 12 drops out or the relay 12' pulls in to energize motor M for operation to adjust the fuel supply valve 16 in the proper sense to compensate for the temperature change. The core 19 is adjusted by the motor M, and a rebalance of the system is obtained to stop operation of the motor when the new value of inductance 18 counteracts the effect of the temperature-produced change in the resistance 17.

It is to be noted that this rebalance of the operating conditions is not effected at the preselected normal temperature but at some value that differs from normal by an increment that varies with the sensitivity of the control system, the time lag between fuel supply changes and temperature changes, and other factors. The corrective action is proportional to the temperature change, when, as is desirable, the relay pick-up values are closely spaced to limit the "neutral" range of the control relay to a negligible value. The system is reset for operation at the desired control point by the delayed corrective action of the temperature-produced change in the value of resistance 22 through the adjustment of resistance 24, by the motor M, in the current supply circuit to the heater resistance 23. The resetting circuit produces an unbalance of the oscillator circuit in the same sense and of the same magnitude as the initial unbalance introduced by the change in the value of the resistor 17. This secondary unbalance takes place at a slower rate than the rebalance operation of the rebalancing inductance 18 and, in effect, neutralizes the initial rebalance and necessitates a further operation of the motor M to adjust the effective value of inductance 18, and also to adjust the fuel supply valve 16, in the same sense as before to obtain a new or "reset" balance of operating conditions at the preselected desired temperature.

As indicated above, one satisfactory physical construction for the oscillator coils L1, L2 and the coupling coil L3 is shown in Fig. 2. The oscillator inductances L1, L2 may take the form of small space-wound coils axially spaced from each other, and the coil L3 may comprise a few turns wound upon a multilayer, space wound inductance L1. The primary circuit of Fig. 2 differs from that shown in Fig. 1 in the replacement of resistor 17 by an inductance 27 having an adjustable core 28 that is displaced by bellows 29 that responds to temperature or pressure changes. The factor-responsive inductance 27 and the rebalancing inductance 18 are connected in parallel in this embodiment of the invention, and the single series condenser C of the Fig. 1 circuit is replaced by separate condensers 30 in series with inductances 18, 27, respectively. The cores 19 and 28 may be of magnetic or of non-magnetic material.

The resetting elements are included in the primary low-impedance circuit in the modification of the Fig. 1 circuit arrangement that is illustrated in Fig. 3. The resetting elements comprise a temperature variant resistor 31 connected, in series with a condenser 32, across the primary circuit, the effective value of the resistor being controlled by current supplied to heater resistor 33 through resistance 24 that is adjustable by the motor M. An auto-transformer coupling of the primary circuit to the oscillator circuit is employed in this form of the invention, the coil L3 comprising a few turns of the plate coil L2. The inductances 18 and 27 are shown in series with each other and with condenser C and inductance L3, and this arrangement is an electrical equivalent of the parallel connection of inductances 18, 27 that is illustrated in Fig. 2.

The primary circuit may include an inductance 35 and a resistance 36 in series that are individually adjusted in accordance with changes in the same or in different control factors, Fig. 4a, or the inductance 35 and resistance 36 may be in parallel, Fig. 4b. When resetting is desired, the resetting impedance may be included in primary circuits such as shown diagrammatically in Figs. 4a and 4b or may be otherwise connected into the electronic circuit to produce an unbalance duplicating the original factor-produced unbalance, i. e. to cancel out the initial rebalance that follows a change in the magnitude of the control factor.

Figure 5:
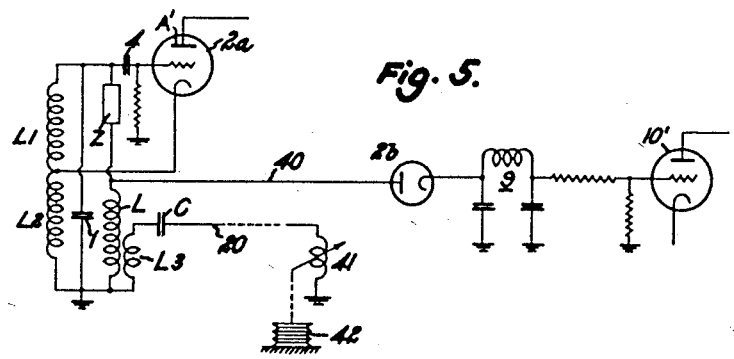
Fig. 5 is a fragmentary circuit diagram of an electronic measuring or control apparatus in which the low impedance primary circuit regulates the output of an electronic amplifier by a voltage divider action.

A generalized illustration of other embodiments of the invention is presented in Fig. 5 which is a fragmentary circuit diagram of the connections through the amplifier tube of the measuring or control system. The circuit arrangement is similar to that of Fig. 1 except that the oscillator-rectifier tube 2 of Fig. 1 is replaced by separate oscillator and rectifier tubes 2a, 2b, respectively, that work into the amplifier tube 10'. The oscillator coils L1, L2 are shunted by a network Z, L; and the anode A' of the rectifier tube 2b is connected to the junction of Z, L by a lead 40. The resonant primary circuit includes a coil L3 of a few turns coupled to coil L, a condenser C, and a factor-variable impedance that, as shown, comprises an inductance 41 that is adjusted by a control element such as the bellows 42. The network Z, L functions as a voltage divider and the control is based upon a variation of the amplified output of tube 10' by a regulation of the input to the tube 10'. The rebalancing and resetting elements are not illustrated in the circuit diagram and may be of any desired design, and the lead 20 of the primary circuit may be paralleled by a return lead 20' which, for simplicity of illustration, is not shown.

Figure 6:
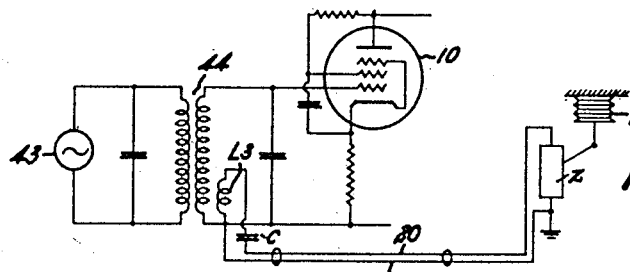
Fig. 6 is a fragmentary circuit diagram of a measuring or control system in which the controlled current is derived from an electronic amplifier by regulating the amplification rate through a primary circuit coupled to the amplifier input circuit.

The tuned primary circuits that are characteristic of this invention may be employed, as shown in Fig. 6, to impose the factor-produced variation upon an amplifier type of control system, i. e. to vary the efficiency of transmission to obtain the desired measuring or control operation. A high frequency current source 43 is coupled by a tuned transformer 44 to the amplifier tube 10 that works into a control network that may be of the general type shown in Fig. 1. The primary circuit comprises a coil L3 of a few turns coupled to a winding of transformer 44, a tuning condenser C, and an impedance Z that is varied in magnitude in accordance with a selected control factor, for example by a bellows 29 that responds to temperature and/or pressure variations. The leads 20, 20' of the primary circuit are banded or otherwise held in fixed relation to each other to prevent an inadvertent pick-up from stray fields. When the control or measuring element varies a capacitive reactance Z, it is preferable to use leads 20, 20' of the coaxial cable type such as used in ultra high frequency and television circuits. The rebalancing element, not shown, of the measuring or control system is actuated by the controlled apparatus to re-establish a balance and thereby stop the operation of the controlled apparatus upon a displacement that compensates for the variation in the magnitude of the control factor.

Figure 7:
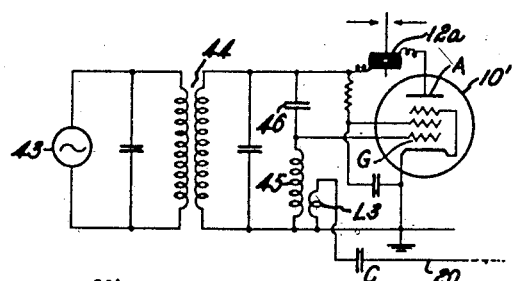
Fig. 7 is a circuit diagram of an electronic control system of the phase-shift type in which the primary circuit has a step-up inductive coupling to the phase-controlling inductance of the system.

The initial unbalance of the oscillator or amplifier network by a factor-produced variation of an impedance in the primary circuit may arise from a change in tuning, a change in phase or from a combination of these effects. The phase shift may be made the dominant effect by coupling the primary circuit to a reactance of a phase-splitting network. As illustrated in Fig. 7, the primary circuit includes a coil L3 coupled to the inductance 45 that, in series with a condenser 46, is shunted across the transformer 44 that couples the high frequency source 43 to the amplifier tube 10'. The control grid G is connected to the junction of inductance 45 and condenser 46, and the other terminal of condenser 46 is connected to the high voltage terminal of the secondary of transformer 44 and, through the relay 12a, to the anode A of tube 10'. The tube 10' may be a "thyratron" or a gas filled tube of type 2050 or 2051 that affords a smooth variation of output average current magnitude with change in the factor-produced adjustment of the relative phases of the potentials impressed upon the control grid G and the anode A of the amplifier tube.

The invention is also applicable to control or measuring circuits in which the efficiency of transmission between an oscillator tube 47 and an amplifier tube 48 is controlled by varying the resonant frequency of a loop circuit, including a tuned coil 49 coupled to an oscillator inductance 50, by a primary circuit comprising a coil L3 of a few turns coupled to inductance 49 and a pair of small coils 51. The coils 51 are positioned adjacent the path of a vane 52 carried by the moving system 53 of a measuring instrument that is adjustable in accordance with variations in the selected control factor, and the factor-produced variations in the effective inductance of coils 51 are magnified in the loop circuit by the step-up ratio of the coupling L3, 49.

A relatively simple circuit arrangement for obtaining a proportional control without the use of a modulating or progressively adjustable control element, as illustrated in Fig. 9, is based upon the relative lengths of the "on" and "off" periods of energization of the input system of an apparatus or process. The oscillator-amplifier OA is of the type previously described with respect to the Fig. 1 circuit, and the primary circuit for affecting the balance condition of the amplifier comprises, in series, a coil L3 coupled to the oscillator coil L1, a condenser C and a temperature-variant resistance 17 in a furnace or oven 55 that is heated by current supplied to a resistor 56 from a current source 57. Lead L from source 57 is permanently connected to the heating resistor 56, and lead L' is connected to the other terminal of the resistor 56 through the normally open contacts 58 of a relay 59 that is controlled by the oscillator-amplifier OA in accordance with the balance condition of the oscillator circuit L1, L2, 1. The resistance 56 and supply voltage are so related that a continuous energization of the heater resistance would develop substantially more than the average heat requirement, for example approximately twice the average heat requirement, i. e. the desired temperature will be maintained by repeatedly opening and closing the heater circuit for short periods of approximately equal duration.

The oscillator circuit and primary circuit are so related that the amplified oscillator output holds in the relay 59 so long as the oven temperature is below the desired value. The power supply switch 58 is therefore held closed during the heating-up of the oven when it is started cold. As the oven temperature approaches the desired control point, the increasing magnitude of the temperature-variant resistance 17 unbalances the oscillator circuit and decreases the oscillatory current output. The relay contacts 58 open when the oven temperature reaches the desired value, thus opening the circuit to heater resistance 56. The oven temperature thereby falls and the effective value of resistance 17 decreases to a value at which the input circuit is again balanced to develop a current output that energizes relay 58 to re-close the heating circuit. This type of control is satisfactory for some purposes and constitutes one embodiment of the novel primary circuit of this invention but it is preferable to include a rebalancing action that reflects, or is determined by, the circuit-produced adjustment of the heat input to the oven.

The rebalancing system shown in Fig. 9 is generally similar in design to the resetting system of the Fig. 1 circuit, and corresponding elements are identified by primed reference numerals. A coil 21' of a few turns of wire is wound on the oscillator inductance L1 and connected to the temperature-variant resistance 22' in heat-transfer relation to a heater resistance 23' that is shunted across the oven heater resistance 56 through an adjustable voltage-dropping resistance 60. The resistor 22' is heated continuously during the warming up of the oven and the effective value of resistor 22' will reach its maximum value, corresponding to its maximum unbalancing effect upon the oscillator circuit, before the oven temperature reaches the desired value at which the increasing effective resistance of resistor 17 completes the unbalance of the oscillator circuit to drop the oscillatory current output below the critical value at which relay 59 is de-energized. The opening of relay switch 58 interrupts the heat supply to the oven and to the heating resistance 23', and the resistors 17 and 22' cool down and decrease in effective resistance, thereby tending to rebalance the oscillator circuit. The decreasing temperature, and corresponding decrease in effective resistance, of the resistor 22' results in a rebalance of the oscillator circuit before the oven temperature drops to the value at which the resistance 17 could restore the circuit balance to increase the tube output to re-energize the relay 59 for a further supply of heat to the oven.

The heat storage characteristics of the resistor 22' should be relatively short, on a time basis, as compared with the heat storage characteristic of the oven to avoid a "hunting" of the oven temperature upon a change in operating conditions that alters the oven temperature. The rate of heating of the resistor 22' may be controlled by manual adjustment of the resistor 60 that is in series with the heating resistor 23', and the rates of heat transfer to and of heat disssipation from the resistor 22' may be stabilized by enclosing the resistors 22', 23' within a sealed envelope that may be evacuated or may be filled with gas. It has been convenient to employ a double filament electric light bulb, such as a conventional automobile headlight bulb, for the resistors 22', 23' when the controlled process or apparatus is of such character that the length of an "on-off" cycle is of the order of from one to several seconds.

The Fig. 9 circuit does not illustrate any means for resetting the balance conditions of the oscillatory circuit to return the oven temperature to its desired value but it will be apparent that a resetting circuit could include a second coil 21' coupled to inductance L1 and a resistor 22' heated by a second resistor 23' in series with the illustrated resistor 23', the resistor 22' of the resetting circuit having a higher heat storage capacity than the illustrated resistor 22' of the rebalancing circuit.

The described method of incorporating a proportional control in an "on-off" regulating system may be employed for automatically controlling some factor other than temperature, and the relation between the balance condition of the oscillatory input circuit and the energization of the relay 59 may be varied in accordance with the circuit connections to the relay contacts and the operating characteristics of the process or apparatus that is to be controlled.

The current source 57 for energizing the control circuit of Fig. 9 is preferably the usual 110 or 220 volts, 60 cycles per second, lighting and power circuit. Voltage regulation is frequently relatively poor on distribution circuits in some localities and some prior electronic control systems have included duplicate oscillator and/or amplifier networks to balance out the effects of variations in the supply voltage. This prior duplication of networks is eliminated in the control system of Fig. 9 which includes means for counteracting the tendency towards an increased oscillator output upon an increase in the voltage of the current from the energizing source 57. The circuit network for compensating for supply voltage variations comprises a coil 62 of a few turns coupled to the oscillator inductance L1 and connected to a temperature-variant resistance 63 that is heated by a resistor 64 connected across the current source 57 through an adjustable voltage-dropping resistance 65. The resistances 63, 64 may be the filaments of a headlight bulb 66. An increase in the voltage of supply source 57 results in an increased heat transfer from resistance 64 to resistance 63, thereby increasing the resistance reflected into the oscillatory circuit and compensating for the increase in oscillatory current output that would otherwise result from an increase in the energizing potentials impressed upon the oscillator-amplifier network. This arrangement for suppressing the effects of variations in the supply voltage may, of course, be incorporated in the previously described measuring or control systems.

The several described embodiments of the invention are indicative of the latitude in circuit construction and arrangement, and it is to be understood that other control and/or measuring systems fall within the scope of the invention as set forth in the following claims.

Broad claims to control systems of the modulated current pulse type, as exemplified in Fig. 9, are presented in my co-pending application Serial Number 794,462, filed December 30, 1947.

I claim:

1. An electronic measuring or control apparatus responsive to variations in the magnitude of a selected factor and of the type including an electronic tube, a resonant input circuit network coupled to said tube and including means responsive to an unbalance of operating conditions to alter the tube output current, and an output circuit network coupled to said tube and including means operative by an altered current output to re-establish a balance of the operating conditions; characterized by the fact that one of said means comprises a low impedance circuit insensitive to small capacity changes, said low impedance circuit comprising a coil of a few turns coupled inductively to a multi-turn inductance in one of said networks, a non-capacitive impedance adjustable to affect the balance conditions, and means tuning the low impedance circuit to substantially the resonant frequency of said input circuit network.

2. In an electronic measuring or control apparatus responsive to variations in the magnitude of a selected control factor; an electronic tube, an input circuit for said tube comprising a pair of coupled multi-turn inductances and capacitance forming a resonant circuit, an output circuit network for said tube including a controlled device responsive in opposite sense to departures of the current output of said tube in one direction or the other from a preselected normal value, and means responsive to a departure of the control factor from a preselected magnitude to alter the tube output current from said preselected normal value; said means comprising a low impedance circuit insensitive to small capacity changes, said low impedance circuit including a coil of a few turns inductively coupled to one of said multi-turn inductances of the tube input circuit, a non-capacitive impedance variable in magnitude with changes in the magnitude of said control factor, and means tuning the low impedance circuit to substantially the resonant frequency of said tube input circuit.

3. An electronic measuring or control apparatus as recited in claim 2, wherein said coil and said inductance to which it is coupled have an auto-transformer coupling, said coil comprising a few turns of said inductance.

4. An electronic measuring or control apparatus responsive to variations in the magnitude of a selected factor and of the type including an electronic tube, a resonant input circuit coupled to said tube and including means responsive to an unbalance of operating conditions to alter the tube output current, and an output circuit network coupled to said tube and including means operative by an altered current output to re-establish a balance of the operating conditions; characterized by the fact that each of said balance-affecting means comprises an adjustable non-capacitive impedance in a low impedance circuit having a coil of a few turns inductively coupled to an inductance of said input circuit network.

5. An electronic measuring or control apparatus as recited in claim 4, in combination with a resetting impedance in said low impedance circuit, and time-delay means operable by a change in the current output of said tube to adjust the effective value of said resetting impedance substantially to duplicate the initial unbalance that resulted in a change in the current output, thereby to restore the operating conditions to substantially the status existing prior to the initial unbalance.

6. In an electronic measuring or control apparatus, an electronic oscillator tube and associated normally balanced oscillatory network for determining the frequency and magnitude of the oscillatory current output of the tube, said network including a pair of coupled inductances and a condenser forming an oscillatory circuit, a controlled device operable in response to departures of the current output of the tube from a preselected normal value, a coil of a few turns having an inductive coupling to one of said inductances, a variable impedance and a condenser co-operating with said coil to form a tuned low impedance circuit insensitive to small capacity changes for unbalancing said oscillatory network upon a change in the effective value of the variable impedance by a selected control factor, and means actuated by said controlled device for re-balancing said oscillatory network upon operation of said controlled device in response to the output current change resulting from the unbalance of the oscillatory network.

7. In an electronic apparatus for controlling the temperature of a heating unit, an electronic oscillator tube and associated normally balanced network for determining the frequency and magnitude of the oscillatory current output of the tube, said network including a pair of coupled inductances and a condenser forming an oscillatory circuit, heat supply means including a regulating device operable in response to departure of the current output of the tube from a preselected normal value corresponding to a preselected temperature, a balance-controlling circuit including a coil having inductive coupling to an inductance of the oscillatory network and a non-capacitive impedance variable in response to the temperature of said heating unit, and means actuated by said regulating device for rebalancing said network.

8. In an electronic apparatus for controlling the temperature of a heating unit, the invention as recited in claim 7 wherein said impedance is a temperature-variant resistor.

9. In an electronic apparatus for controlling the temperature of a heating unit, the invention as recited in claim 7, wherein said rebalancing means comprises a rebalancing impedance in said balance-controlling circuit, and means actuated by said regulating device for adjusting the effective value of said rebalancing impedance.

10. In an electronic apparatus for controlling the temperature of a heating unit, the invention as recited in claim 7, in combination with time-delay means actuated by said regulating device for resetting the oscillatory network to balance at the preselected temperature.

11. In an electronic apparatus for controlling the temperature of a heating unit, the invention as recited in claim 7, in combination with time-delay means actuated by said regulating device for resetting the oscillatory network to balance at the preselected temperature; said time-delay means comprising a temperature-variant resistor coupled to said oscillatory network, a heating resistance in heat exchange relation to said temperature-variant resistor, and means actuated by said regulating device for controlling the current through said heating resistor.

12. In an electronic apparatus for controlling the temperature of a heating unit, the invention as recited in claim 7, in combination with time-delay means actuated by said regulating device for resetting the oscillatory network to balance at the preselected temperature; said time-delay means comprising a temperature-variant resistor in said balance-controlling circuit, a heating resistance in heat exchange relation to said temperature-variant resistor, and means actuated by said regulating device for controlling the current through said heating resistor.

13. In an electronic measuring or control apparatus, a source of oscillatory current, an electronic tube having an input network coupled to said source, said network being normally balanced at a selected control factor value to develop a predetermined normal current output from said tube, an output network for said tube including a controlled device operative upon departure of the current output from its normal value, and a controlling circuit for affecting the balance of the input circuit network in accordance with changes in the magnitude of a selected control factor; said controlling circuit including a coil coupled to an inductance of said input circuit network, and a non-capacitive impedance varying in magnitude with said control factor.

14. In an electronic measuring or control apparatus, the invention as recited in claim 13 wherein said input circuit network includes an impedance in series with the inductance to which said coil is coupled, said serially arranged impedance and inductance being connected across said current source, and circuit elements connecting said tube across said inductance.

15. In an electronic measuring or control apparatus, the invention as recited in claim 13 wherein said input circuit network includes a condenser in series with the inductance to which said coil is coupled, said serially arranged condenser and inductance being connected across said current source, and circuit elements connecting said tube across said inductance.

16. In an electronic measuring or control apparatus, a source of oscillatory current, an electronic tube having an input network coupled to said source, said network being normally balanced at a selected control factor value to develop a predetermined normal current output from said tube, an output network for said tube including a controlled device operative upon departure of the current output from its normal value, and a controlling circuit for affecting the balance of the input circuit network in accordance with changes in the magnitude of a selected control factor; said controlling circuit including a coil coupled to an inductance of said input circuit network, an adjustable non-capacitive impedance, and means controlled by said factor for adjusting said impedance.

17. An electronic control apparatus of the type including a relay for repeating the cycle of opening and of closing a condition-controlling circuit for short time periods as the magnitude of a selected factor departs in one sense or the other from a desired value, an electronic tube having an oscillatory input circuit and an output circuit including said relay, means responsive to the magnitude of the selected factor for controlling the balance of said input circuit network and thereby the tube output current that determines the relay operation, and means for altering the relative lengths of the circuit-open and circuit-closed conditions of a cycle in accordance with the magnitude of the departure of the selected factor from its desired value; characterized by the fact that said last means includes a circuit comprising a coil coupled to said oscillatory input circuit and a temperature-variant impedance, and a heater circuit controlled by contacts of said relay and including a current source and a heating resistor in heat-exchange relation with said temperature-variant impedance.

18. In an electronic apparatus for automatically controlling a condition affecting a process or apparatus and of the type including a relay for repeating the cycle of opening and closing a condition-controlling circuit for short time intervals as the magnitude of a selected factor departs in one sense or the other from a desired value, the combination with an electronic tube having an oscillatory input circuit and an output circuit including the relay, said input circuit being normally balanced during a departure of the selected factor in one sense from its desired value to actuate the relay in the sense that adjusts the condition-controlling circuit to restore the selected factor to its desired value, and means responsive to a reversal of the sense of departure of the selected factor from its desired value to unbalance the oscillatory input circuit, thereby to alter the tube output current and actuate the relay in the opposite sense to reverse the adjustment of the condition-controlling circuit, of means controlled by said relay for adjusting the balance condition of said oscillatory input circuit in accordance with the relative lengths of the time intervals of circuit-open and circuit-closed condition in a cycle; said last means comprising a circuit including a coil coupled to said input circuit and a temperature variant impedance, a heating resistor in heat exchange relation with said impedance, and a heating circuit including said heating resistor and contacts of said relay.

19. An electronic control apparatus of the type including a relay for repeating the cycle of opening and closing a circuit supplying energy to an apparatus for short time periods as the magnitude of a factor dependent upon such energy supply departs in one sense or the other from a desired value, an electronic tube having an oscillatory input circuit normally balanced at values of the selected factor corresponding to an energy demand to establish a normal output current, an output circuit including a relay energized to contact-closed condition by said normal output current, an energy-supply circuit including said relay contacts, and means responsive to changes in the magnitude of the selected factor to unbalance the input circuit when the factor value corresponds to an excess energy input, and means for altering the relative lengths of the circuit-open and circuit-closed conditions of a cycle in accordance with the magnitude of the departure of the selected factor from its desired value; characterized by the fact that said last means includes a circuit comprising a coil coupled to said oscillatory input circuit and a temperature-variant impedance, and a heater circuit controlled by contacts of said relay and including a current source and a heating resistor in heat-exchange relation with said temperature-variant impedance.

20. In an electronic control apparatus, the combination with an electronic tube having an oscillatory input circuit, means responsive to a selected factor for varying the balance of said oscillatory input circuit and thereby the tube output current, a relay in the output circuit of the tube operable between an operated and an inactive condition as the tube output current varies in opposite sense from a selected value, and means energized by said relay in one condition thereof to shift the magnitude of the selected factor in one sense, of means controlled by said relay for altering the balance of the oscillatory input circuit in accordance with the relative lengths of periods of operated condition and inactive condition of said relay; said controlled means comprising a circuit including a coil coupled to said input circuit and a temperature-variant impedance, a heating resistor in heat-exchange relation with said temperature-variant impedance, and means including contacts of said relay for supplying current to said heating resistor.

21. In an electronic control apparatus, the combination with an electronic tube having an oscillatory input circuit, temperature-responsive means for varying the balance of the input circuit to vary thereby the magnitude of the tube output current in accordance with the temperature of a heated unit, a tube output circuit including a relay having contacts operable between open and closed condition as the tube output current swings through a preselected normal value, and means including said relay contacts for controlling an on-off supply of heat energy to said heated unit, whereby the relative lengths of open condition and closed condition of said relay contacts vary with the departure of the temperature of the heated unit from a desired value, of balancing means including a temperature-variant impedance and an impedance-heating circuit controlled by contacts of said relay for adjusting the balance condition of the oscillatory input circuit in accordance with the magnitude of the departure of the temperature of the heated unit from said desired value.

22. In an electronic temperature-control apparatus, the combination with an electronic tube having an oscillatory input circuit, temperature-responsive means for varying the balance of said circuit and thereby the tube output current in accordance with the temperature of a heated unit, a tube output circuit including a relay having contacts operable between open and closed condition as the tube output current swings through a preselected normal value, and a unit heating circuit for said unit including a resistance and a current source in series with said relay contacts, of a balancing circuit including a coil coupled to said oscillatory input circuit and a temperature-variant resistor, a resistor heating circuit comprising a resistance and source of current for heating said temperature-variant resistor, and contacts actuated by said relay for controlling said heating circuits.

23. In an electronic temperature-control apparatus, the invention as recited in claim 22 wherein said unit heating circuit and said resistor heating circuit are in parallel with each other and a single set of relay contacts controls the connection of said parallel circuits to a common source of current.

24. An electronic measuring or control apparatus of the type including an electronic tube having an oscillatory input circuit, a tube output circuit in which the current output varies with the balance condition of said oscillatory input circuit, a balance-affecting circuit including a temperature-variant resistor and a coil coupled to said oscillatory input circuit, and means including a heating resistor in heat-exchange relation to said temperature-variant resistor for controlling said balance-affecting circuit; characterized by the fact that said resistors are housed within a sealed evacuated envelope.

25. An electronic measuring or control apparatus as recited in claim 24, wherein said resistors and their enclosing sealed envelope comprise a double filament electric light bulb.

26. An electronic measuring or control apparatus including an electronic tube having an input circuit network and an output circuit network, means responsive to a variable factor for affecting the balance of the input circuit network and thereby the tube output current, a current source of variable potential for energizing said tube, and stabilizing means rendering the tube output current substantially independent of fluctuations in the potential of said current source; said stabilizing means comprising a balance-affecting circuit coupled to said input circuit and including a temperature-variant impedance, a heating resistor in heat-exchange relation with said temperature-variant impedance, and circuit elements connecting said heating resistor across said current source.

27. An electronic measuring or control apparatus as recited in claim 26 wherein said temperature-variant impedance is a resistor.

28. An electronic measuring or control apparatus as recited in claim 26 wherein said temperature-variant impedance is a resistor, said temperature-variant resistor and said heating resistor being housed in a sealed envelope.

29. An electronic measuring or control apparatus as recited in claim 26 wherein said temperature-variant impedance is a resistor, said temperature-variant resistor and said heating resistor are the filaments of a double filament electric light bulb.

GEORGE A. F. MACHLET.

REFERENCES CITED

The following references are of record in the file of this patent:

UNITED STATES PATENTS

| Number | Name | Date |
| --- | --- | --- |
| 2,169,977 | MacDonald | Aug. 15, 1939 |
| 2,303,654 | Newton | Dec. 1, 1942 |
| 2,189,461 | Donle | Feb. 6, 1940 |
| 2,234,030 | Walker | Mar. 4, 1941 |
| 1,741,601 | Appelberg | Dec. 31, 1929 |
| 2,138,593 | Breitenstein | Nov. 29, 1938 |